United States Patent [19]

Brown

[11] Patent Number: 4,646,096
[45] Date of Patent: Feb. 24, 1987

[54] ENHANCED GLOBAL POSITIONING SYSTEM DELTA-RANGE PROCESSING

[75] Inventor: Alison Brown, Simi Valley, Calif.

[73] Assignee: Litton Systems, Inc., Beverly Hills, Calif.

[21] Appl. No.: 659,231

[22] Filed: Oct. 5, 1984

[51] Int. Cl.$^4$ .............................................. G01S 5/02
[52] U.S. Cl. .................................. 342/357; 342/356; 342/358; 342/394
[58] Field of Search ........... 343/6.5 R, 6.5 LC, 7 PL, 343/352, 356–358, 394; 364/443, 449, 457; 370/104; 375/97

[56] References Cited

U.S. PATENT DOCUMENTS

| | | | |
|---|---|---|---|
| 3,941,984 | 3/1976 | Chappell et al. | 343/357 X |
| 4,024,383 | 5/1977 | Beasley | 364/449 |
| 4,042,923 | 8/1977 | Merrick | 343/6.5 R X |
| 4,232,313 | 11/1980 | Fleishman | 343/6.5 R |
| 4,286,270 | 8/1981 | Veselkov et al. | 343/352 X |
| 4,468,793 | 8/1984 | Johnson et al. | 375/97 |
| 4,485,383 | 11/1984 | Maher | 370/104 |
| 4,562,437 | 12/1985 | Sasaki et al. | 343/394 |
| 4,578,678 | 3/1986 | Hurd | 343/357 |

OTHER PUBLICATIONS

R. Mehra, "Estimation Theory", *Encyclo. of Science and Tech.*, (5th ed., 1982, pp. 192-195).
M. Sturza, "Digital Signal Processing Techniques for GPS Receivers"; (IEEE Nat'l. Telesystems Conf., 11/83).

*Primary Examiner*—Theodore M. Blum
*Assistant Examiner*—Bernarr Earl Gregory
*Attorney, Agent, or Firm*—Gerald L. Cline

[57] ABSTRACT

A circuit is shown which utilizes signals transmitted from global positioning system satellites to create change in phase signals. The change in phase signals are measured over a predetermined time interval, one second, and stored. The stored signals are applied to a Kalman filter and back to the storage unit so that each one second time interval includes the information from all previous time intervals. This accumulated information is referred to as accumulated Delta-Range information which permits a more rapid determination of position by the circuit.

13 Claims, 1 Drawing Figure

ENHANCED GLOBAL POSITIONING SYSTEM DELTA-RANGE PROCESSING

FIELD OF THE INVENTION

The present invention relates to an apparatus and method for improving the accuracy obtained from a global positioning system which comprises a plurality of satellites each broadcasting two or more navigational signals.

BACKGROUND OF THE INVENTION

The NAVSTAR Global Positioning System (GPS) is a satellite-based radio-navigation system intended to provide highly accurate three-dimensional position and precise time on a continuous global basis. When the system becomes fully operational in late 1988, it will consist of 18 satellites in six orbital planes, and three active spares.

Each satellite will continuously transmit navigation signals at two carrier frequencies, L1=1575.42 MHz and L2=1227.6 MHz consisting of the P-code ranging signal (a 10.23 MBPS pseudonoise code), the C/A-code ranging signal (a 1.023 MBPS pseudonoise code), and 50 BPS data providing satellite ephemeris and clock bias information. Unbalanced Quadri-Phase Shift Keying (UQPSK) modulation is utilized with the data bits added to the ranging codes, the C/A-code signal lagging the P-code signal by 90°; and the C/A-code signal power nominally exceeding the P-code signal power by 3 dB.

Navigation using GPS is accomplished by passive triangulation. The GPS user equipment measures the Pseudo-Range to four satellites, computes the position of the four satellites using the received ephemeris data; and processes the Pseudo-Range measurements and satellite positions to estimate three-dimensional user position and precise time.

GPS receiver signal processing can be partitioned into three parts: RF signal processing, estimation of In-phase (I) and Quadrature-phase (Q) signals; and subsequent processing of these I and Q signals to implement code and carrier tracking, data demodulation, SNR estimation, sequential detection, and lock detection functions. Traditionally, all three parts are implemented using analog signal processing techniques.

A paper briefly reviewing analog RF signal processing implementation which describes three digital signal processing (DSP) techniques for implementing the I/Q generation function, and describes DSP algorithms for implementing the subsequent processing functions may be found in the NTC '83 *IEEE 1983 National Telesystems Conference papers*, entitled "Digital Signal Processing Techniques For GPS Receivers," by Mark A. Sturza, November 1983. This paper reviewing RF signal processing implementation for GPS Receivers is hereby incorporated by reference.

A Delta-Range (DR) measurement is derived from the difference in carrier phase over a fixed time interval. Position can be estimated using Delta-Ranges through the change in the satellite position over the observation interval. In the prior art, it would generally take approximately 24 hours of processing Delta-Range measurements to obtain a reasonable accuracy for the location of the receiver utilizing a global positioning system.

Accordingly, it is an object of the present invention to reduce the amount of time required to obtain an accurate location of the receiver utilizing a global positioning system.

SUMMARY OF THE INVENTION

The present invention replaces the measurement of the Delta-Range over a plurality of predetermined time intervals with an improved configuration. Under the improved configuration, the Delta-Range measurement, generally measured over a one-second period, is accumulated for the first second. Thereafter, the Delta-Range is accumulated for the first and second second; followed by accumulation of the Delta-Range for the first, second and third second; and so on. The heart of the invention is the realization that such accumulation of all Delta-Range measurements for each new time interval and all old time intervals eliminates many of the errors created when measuring a Delta-Range for an individual time period. By adding information from previous Delta-Range measurements to the newest Delta-Range measurement, it is possible to determine the position of the receiver utilizing a global positioning system in a much faster time time frame. For example, an accurate position can be determined utilizing the global positioning system and the present invention in less than eight hours. This is an improvement of better than 3:1.

DESCRIPTION OF THE DRAWINGS

A better understanding of the benefits and advantages of the present invention will be available after a careful review of the following specification and drawing, wherein.

DESCRIPTION OF THE PREFERRED EMBODIMENT

Figure 1:
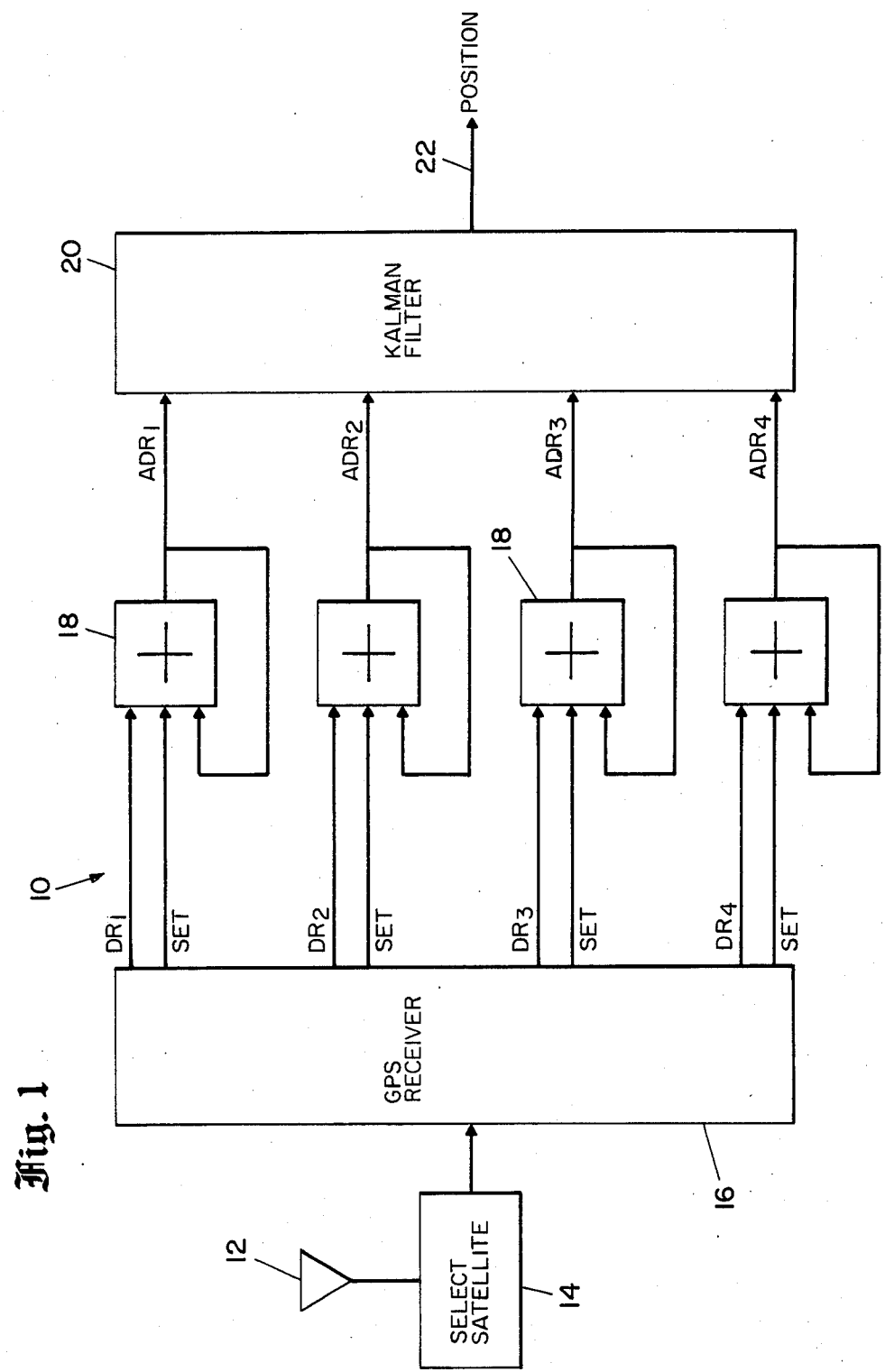
FIG. 1 is a block diagram showing the enhanced global positioning system Delta-Range positioning of the present invention.

A GPS receiver makes a measurement of Pseudo-Range (PR), the difference between the time of reception and time of transmission of the GPS signal, from tracking the Pseudo Random Noise (PRN) codes modulated on the GPS carrier. The Delta-Range (DR) measurement is derived from the difference in carrier phase over a fixed time interval, generally one second, measured using a Phase Locked Loop (PLL). The Pseudo-Ranges and Delta-Ranges are related to user position error, $\bar{R}_u$, velocity error, $\bar{V}_u$, and user clock and frequency offsets, $\bar{B}_u$ and $\Delta \bar{B}_u$ through equations 1.1–1.5.

$$\underline{1}_i^k = \frac{(\underline{R}_u^k - \underline{R}_{si}^k)}{|\underline{R}_u^k - \underline{R}_{si}^k|} \quad 1.1$$

$$\hat{PR}_i^k = \underline{1}_i^k \cdot (\underline{R}_u^k - \underline{R}_{si}^k) + \hat{B}_u^k \quad 1.2$$

$$\hat{DR}_i^k = \hat{PR}_i^k - \hat{PR}_i^{k-1} \quad 1.3$$

$$\tilde{PR}_i^k = PR_i^k - \hat{PR}_i^k = \underline{1}_i^k \cdot \underline{\tilde{R}}_u^k + \tilde{B}_u^k \quad 1.4$$

$$\tilde{DR}_i^k = DR_i^k - \hat{DR}_i^k = (\underline{1}_i^k - \underline{1}_i^{k-1}) \cdot \underline{\tilde{R}}_u^k + \underline{1}_i^k \cdot \underline{\tilde{V}}_u^k + \Delta \tilde{B}_u^k \quad 1.5$$

$\underline{1}_i^k$: LOS from user to ith satellite at time $t_k$.
$\underline{R}_u$: Position of user.
$\underline{V}_u$: Velocity of user.
$\underline{R}_{si}$: Position of ith satellite.

$PR_i^k$: Pseudo Range to ith satellite at time $t_k$.
$DR_i^k$: Delta-Range to ith satellite at time $t_k$.
$B_u$: Users clock offset from GPS time.
$\Delta B_u$: Change in user's clock offset over one sec.

LOS is an abbreviation for Line Of Sight Vector which incorporates the elevation angle, and azimuth angle, of a satellite.

For static point positioning the user's velocity is known to be zero and so equation 1.5 simplifies to $$\tilde{DR}_i^k = (\underline{1}^k - \underline{1}^p) \cdot \tilde{\underline{R}}_u + \Delta \tilde{B}_u^k \qquad 1.6$$

The LOS vector to a GPS satellite does not change significantly over a one second interval, so to improve the geometry of the navigation solution it is advantageous to accumulate Delta-Ranges even longer time intervals to form a new measurement variable. Accumulated Delta-Ranges (ADR).

Since the Delta-Ranges are formed from the difference between two phase measurements from the carrier tracking phase-locked loops, it is important to note that Accumulating Delta-Ranges to form a new measurement do not increase the measurement error.

$$DR^k = \lambda \left( n^k + \frac{\phi^k}{2\pi} - n^{k-1} - \frac{\phi^{k-1}}{2\pi} \right) \qquad 1.7$$

$$ADR^k = \sum_{j=1}^{k} DR^j = \lambda \left( n^k + \frac{\phi^k}{2\pi} - n^{k-1} - \frac{\phi^{k-1}}{2\pi} + n^{k-1} + \frac{\phi^{k-1}}{2\pi} - n^{k-2} - \frac{\phi^{k-2}}{2\pi} + n^1 + \frac{\phi^1}{2\pi} - n^0 - \frac{\phi^0}{2\pi} \right)$$

$$ADR^k = \lambda \left( n^k + \frac{\phi^k}{2\pi} - n^0 - \frac{\phi^0}{2\pi} \right) \qquad 1.8$$

Note, that the term $n^k$ represents an integer number of cycles whereas the term $\phi^k$ represents the number of radians in each part cycle of the phase shift. The term $n^{k-1}$, represents the number of integer cycles one second before, whereas the term $\phi^{k-1}$ represents the number of radians, within the partial cycle from the sample the second before. These Delta-Range differences are added together wherein the final Accumulated Delta-Range includes all of the information from the initial start through to the final measurement at n° time period.

Defining the phase measurement errors to be:

$$E[\phi^2] = \sigma_\phi^2 \quad E[\phi^k \phi^j] = 0 \quad j \neq k$$
$$E[\phi] = 0$$

Then $$\overline{\tilde{DR}^k} = 0, \text{Var}\{\tilde{DR}^k\} = 2\sigma_\phi^2, \overline{\tilde{DR}^k \tilde{DR}^{k-1}} = \sigma_\phi^2 \qquad 1.9$$

$$\overline{A\tilde{DR}^k} = \tilde{\phi}_0, \text{Var}\{A\tilde{DR}^k\} = \sigma_\phi^2 \qquad 1.10$$

Since adjacent Delta-Range measurements share a common phase measurement, the phase errors associated with these common measurements cancel out in the Accumulated Delta-Range measurement. The Delta-Ranges have zero mean error but are correlated between adjacent time intervals. Alternatively, the Accumulated Delta-Ranges share a common bias error, the initial carrier phase error aparts, but from this bias all samples are uncorrelated.

The measurement equation for the Accumulated Delta Range measurement becomes $$A\tilde{DR}^k = ADR^k - A\hat{DR}^k = (\underline{1}^k - \underline{1}^p) \cdot \tilde{\underline{R}}_u^k + \tilde{B}_u^k - \tilde{B}_u^0 \qquad 1.11$$

As time increases, the satellite geometry for estimating position error improves. Because of the independence between each measurement, it is possible to process an Accumulated Delta-Range every second from each satellite tracked. This allows position to be determined to far greater accuracy than by processing Pseudo-Range Measurements as in the prior art.

As shown in equation 1.10 the Accumulated Delta-Range measurements, generated every second, are independent of each other and each have the same measurement noise as the one second Delta Range Measurements. Four Accumulated Delta Ranges from four satellites being tracked are generated every second and can be processed optimally using a Kalman filter to estimate user position and satellite errors.

As is well-known, a Kalman filter is a device which receives inputs from two or more variables and processes those variables to produce an output which is a function of the input variables. For example, if pressure and temperature were known inputs, it would be possible to feed this information into a Kalman filter to produce an output representing altitude. A similar process is used here. Wherein the Accumulated Delta-Range Measurements from the four satellites are applied to a Kalman filter which produces an output representing the position of the receiving station.

The most significant error sources are the satellite ephemeris errors and the satellite clock error. These errors can be modeled by including four additional states per satellite in addition to the four user position and clock frequency offset states, as shown in Table 1. The observation equation now becomes $$ADR^k = (\underline{1}^k - \underline{1}^p) \cdot (\tilde{\underline{R}}_u - \tilde{\underline{R}}_s) + \tilde{B}_u^k - \tilde{B}_u^0 - \tilde{B}_s^k + \tilde{B}_s^0 \qquad 1.12$$

The clock errors are all lumped together in one clock offset term per satellite which estimates the change in the relative user and satellite clock error over the accumulation time interval.

$$\Delta B_i = (\tilde{B}_u^k - \tilde{B}_u^0) - (\tilde{B}_s^k - \tilde{B}_s^0) \qquad 1.13$$

TABLE 1

| KALMAN FILTER STATES | | | |
|---|---|---|---|
| State No. | Description | Initial Variance | State Noise |
| 1 | $X_u$ - Position Error | 1000 m | — |
| 2 | $Y_u$ - Position Error | 1000 m | — |
| 3 | $Z_u$ - Position Error | 1000 m | — |
| 4 | $\Delta B_u$ - Clock Frequency | 1000 m | 0.67 mm |
| 5,9,13,17 | $\Delta B$ Change in Clock Offset over accumulation inverval | 0 | 2 mm |
| 6,10,14,18 | Along Track Satellite Error | 0.8 | — |
| 7,11,15,19 | Radial Satellite Error | 6.3 | — |
| 8,12,16,20 | Cross Track Satellite Error | 3.0 | — |

This term can also be used to include noise terms to model the range errors introduced by atmospheric effects. The relative clock offset, B, is propagated using the estimate of the users clock frequency offset every second.

$$\text{State Propagation } \Delta B_t^{k+1} = \Delta B_t^k + \Delta B_u^k \qquad 1.14$$

The measurement equation can be written in vector format, as shown for the second satellite tracked.

$$\widetilde{ADR}_2 = [\underline{\Delta l}_N^T \, 0 \mid \underline{0}^T \mid 1 - \underline{\Delta l}_O^T \mid \underline{0}^T \mid \underline{0}^T] \widetilde{x} \qquad 1.15$$

$\underline{\Delta l}_N$ is the delta LOS vector from the satellite to the user, $(l^k - l^o)$, expressed in local level coordinates. $\underline{\Delta l}_O$ is the same vector but expressed in orbital frame coordinates for the second GPS satellite selected; that is with $X_O$ in the Along Track Direction, $Y_O$ in the Radial direction and $Z_O$ in the Cross Track direction.

Processing the Accumulated Delta-Ranges using this Kalman filter gives position to significantly greater accuracy than that normally achievable by GPS, even for P-code users. After tracking for two hours at lower latitudes the Root Sum Square (RSS) position error drops to around 1.0 m RSS and continues to improve gradually, reaching about 0.3 m RSS after about seven hours. At higher latitudes the position accuracy degrades slightly due to the different satellite geometry, but approximately 1 m RSS is achievable in around five hours.

Referring now to the drawing, FIG. 1 shows a receiver 10 which receives transmitted navigational signals from the satellites that comprise the global positioning system via an antenna 12. The transmitted signals are applied to a satellite select circuit 14 which selects the most desirable satellites to be tracked by the global positioning system receiver 16. Once each satellite has been selected, the storage units 18 for each selected satellite are set to zero or cleared of any stored information contained therein. The global positioning receiver then tracks the particular satellites selected and receives the carrier frequency signals from each. After measuring the phase of each of the received carrier signals, the change of phase in the carrier signals is stored within the information storage units 18. In the preferred embodiment, this information is stored over a one second time interval. The Delta-Range measurements are accumulated within the storage units 18 so that the first Delta-Range determined by the first one second interval is accumulated with the Delta-Range information from the second time interval and so on. The outputs of the storage units 18 are applied to a Kalman filter 20 and back to the input of storage units 18 to create Accumulated Delta-Range information. At each time interval, the step of reapplying the output of the storage unit 18 to its input is repeated so there is an accumulation of the Delta-Range information. These steps are repeated as often as necessary until the position information at the output 22 of the Kalman filter represents the accuracy desired.

It will be understood that the present invention may be practiced through the utilization of software or hardware; hardware being represented by the block diagram of FIG. 1.

I claim:

1. A method for enhancing the information received from a global positioning system which includes a plurality of satellites each transmitting at least two carrier frequency signals, comprising the steps of:
   (a) identifying a plurality of selected satellites;
   (b) setting information storage units for accumulated Delta-Range information for each selected satellite to zero;
   (c) tracking the selected satellites;
   (d) receiving said carrier frequency signals from said selected satellites;
   (e) measuring the phase of said carrier frequency signals from said selected satellites;
   (f) storing changes in phase of said carrier frequency signals over a predetermined time interval in said storage units to create a Delta-Range measurement for each selected satellite;
   (g) accumulating the Delta-Range measurement by adding the above-mentioned accumulated Delta-Range information for each satellite to the Delta-Range measurement from step f for each satellite;
   (h) processing the accumulated Delta-Range information from each selected satellite through a filter which receives said input information and produces said information into output information, said output information being position information; and
   (i) repeating steps f, g and h until said position information is refined to the accuracy desired.

2. A method, as claimed in claim 1, wherein: step a includes the selection of four satellites.

3. A method, as claimed in claim 1, wherein: step f includes a one second time interval.

4. A method, as claimed in claim 1, wherein: step h includes the use of a Kalman filter.

5. Apparatus for enhancing the information received from a global positioning system which includes a plurality of satellites each transmitting at least two carrier frequency signals, comprising:
   (a) means for selecting a plurality of satellites whose transmitted signals are to be received;
   (b) means for storing;
   (c) means for setting each means for storing to zero;
   (d) means for receiving said carrier frequency signals from said selected satellites;
   (e) means for measuring the phase of said carrier frequency signals received from said selected satellites;
   (f) means for measuring changes in phase of said carrier frequency signals over a predetermined time interval;
   (g) means for placing said measured changes in phase in said means for storing over said time interval to create a Delta-Range measurement for each selected satellite;
   (h) means for accumulating said Delta-Range measurement by adding the above mentioned accumulated Delta-Range information for each satellite to said Delta-Range measurement;
   (i) filter means for processing said accumulated Delta-Range information for each selected satellite for producing an output representing position information.

6. Apparatus, as claimed in claim 5, wherein: said plurality of satellites includes four satellites.

7. Apparatus, as claimed in claim 5, wherein: said time interval includes a one second time interval.

8. Apparatus, as claimed in claim 1, wherein: said filter means includes a Kalman filter.

9. An apparatus for improving the accuracy of measurement information obtained from a plurality of satellites of a global positioning system, said apparatus comprising:

a satellite selectable global positioning system receiver, said receiver being capable of receiving at least two carrier frequencies from each selected satellite and tracking the difference between their phase measurements, to produce Delta-Range signals which are derived from said phase measurements;

said global positioning system receiver being operatively associated with a resettable data storage and accumulation means, said receiver providing said data storage and accumulation means with said Delta-Range signals;

said resettable data storage and accumulation means storing and accumulating said Delta-Range signals over a first time interval;

said resettable storage means processing said Delta-Range signals to develop a first set of Accumulated Delta-Range signals, said first set of signals being a function of the accumulation of Delta-Range signals at said storage means during said first time interval;

said storage means operatively connected to a filter means, said storage means transmitting said Accumulated Delta-Range signals to said filter and simultaneously feeding back said signals to the storage means, so that said Accumulated Delta-Range signals may be stored in said storage means during a second time interval and processed together with a second set of Delta-Range signals, for deriving a second set of Accumulated Delta-Range signals at the end of said second time interval, at which time said second set of Accumulated Delta-Range signals are transmitted to said filter means;

said filter means further processing said first and said second sets of Accumulated Delta-Range signals from each selected satellite to develop an output signal representative of enhanced position information.

10. The apparatus of claim 9 wherein the Accumulated Delta-Range signals are continuously processed and updated by said storage means over a subsequent series of time intervals, said filter means processing a subsequently derived series of Accumulated Delta-Range signals, thereby the position information so derived is continually updated and made more accurate at the end of each of said subsequent time intervals.

11. The apparatus of claim 9 wherein the filter is a Kalman Filter.

12. A method for improving the accuracy of position measurement information obtained from a global positioning system having a plurality of satellites, each of said satellites transmitting at least two carrier frequency signals, comprising the steps of:

(a) receiving the transmitted satellite carrier frequency signals;

(b) processing said satellite signal through a receiver means capable of identifying and tracking each of the satellites according to their transmitted carrier frequency signals;

(c) deriving an output signal from said receiver means which is characteristic of Delta-Range information for each of said satellites;

(d) processing said output signal through a data accumulation and storage means, deriving an Accumulated Delta-Range information signal, by storing said signal for a predetermined time interval, creating an Accumulated Delta-Range information signal corresponding to each satellite;

(e) repeating said step (d) to further refine the signal so processed, whereby an Accumulated Delta-Range signal is derived which corresponds to an accurate position for each satellite to the degree desired.

13. The method of clam 12, wherein the Accumulated Delta-Range signal derived as a result of steps (d) and (e) is further repeatedly processed through a Kalman Filter to correlate said accumulated signals and correct the information derived, so information obtained from signal processing is further refined and more accurately presented.

* * * * *